(12) United States Patent
McElreath et al.

(10) Patent No.: US 6,889,941 B1
(45) Date of Patent: May 10, 2005

(54) AIRCRAFT FORMATION/REFUELING GUIDANCE SYSTEM

(75) Inventors: Kenneth W. McElreath, Mount Vernon, IA (US); Donald A. Happel, Mount Vernon, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/891,857

(22) Filed: Jul. 15, 2004

(51) Int. Cl.[7] .............................................. B64D 39/00
(52) U.S. Cl. .................. 244/135 A; 244/195; 244/3.16; 244/161; 701/226
(58) Field of Search ................................ 244/194, 195, 244/76 R, 135 A, 3.16, 161; 701/226, 4, 11, 14, 222, 223, 300–302; 250/203.1, 203.2, 322, 342, 208.1; 702/150; 388/5.1

(56) References Cited

U.S. PATENT DOCUMENTS

| | | | | |
|---|---|---|---|---|
| 4,025,193 A | * | 5/1977 | Pond et al. ................... | 356/5.1 |
| 4,157,544 A | | 6/1979 | Nichols | |
| 4,227,077 A | * | 10/1980 | Hopson et al. .......... | 250/203.1 |
| 4,383,663 A | * | 5/1983 | Nichols ...................... | 244/3.16 |
| 5,109,345 A | * | 4/1992 | Dabney et al. ............. | 701/226 |
| 5,326,052 A | * | 7/1994 | Krispin et al. .......... | 244/135 A |
| 5,832,139 A | | 11/1998 | Batterman et al. | |
| 5,856,844 A | | 1/1999 | Batterman et al. | |
| 6,145,784 A | * | 11/2000 | Livingston .................. | 244/3.11 |
| 6,158,694 A | * | 12/2000 | Gowrinathan ............... | 244/171 |
| 6,362,875 B1 | | 3/2002 | Burkley | |
| 6,604,711 B1 | * | 8/2003 | Stevens et al. ......... | 244/135 A |

OTHER PUBLICATIONS

"Underwater Docking of Autonomous Undersea Vehicles a Using Optical Terminal Guidance", S. Cowen, S. Briest, and J. Dombrowski, IEEE Oceans '97, Halifax, NS, Oct. 6–9, 1997.

"Vision Based Station Keeping and Docking for Floating Vehicles", Sjoerd van der Zwaan, Alexandre Bernardino, Jose Santos–Victor, VisLab–TR Jul. 2001, —European Control Conference, ECC2001, Porto, Portugal, Sep. 2001.

Ominiplanar, Inc. Virtual Tracker Technical Description, May 21, 2003.

Computer Graphics Systems Development Corporation, RS–100 Virtual Reality Refueling Simulator, Product Description, 2000.

Cognex Corporation, PatMax Object Location Software Product Description, 2000.

Patent Application for "Relative Navigation for Automated Aerial Refueling Using Datalink Signals" by Gary A. McGraw et al., and filed May 19, 2004.

Patent Application for "A System and Method for Improving Aircraft Formation Flying Accuracy and Integrity" by Kenneth W. McElreath, filed herewith.

* cited by examiner

Primary Examiner—Galen Barefoot
(74) Attorney, Agent, or Firm—Nathan O. Jensen; Kyle Eppele

(57) ABSTRACT

An aircraft formation/refueling guidance system guides a follower aircraft relative to a leader aircraft. A datalink provides a position hold and a bias command from the leader aircraft to the follower aircraft. An optical tracker onboard the follower aircraft takes an image of the leader aircraft when receiving the hold command, tracks the leader aircraft using the image, and provides optical tracker movement outputs. A resolver resolves the optical tracker movement outputs to provide resolver control signals. A vernier control receives the bias command to change a position of the follower aircraft by biasing the resolver control signals with a bias signal. A sum circuit connected to the resolver and to the vernier control receives the resolver control signals and the bias signal to provide a sum circuit output signal. An autopilot and autothrottle receives the sum circuit output signal and the position hold command to control the follower aircraft.

20 Claims, 3 Drawing Sheets

AIRCRAFT FORMATION/REFUELING GUIDANCE SYSTEM

CROSS REFERENCE TO RELATED APPLICATIONS

The present application is related to co-pending application Ser. No. 10/848,708 filed on May 19, 2004 entitled "Relative Navigation for Automated Aerial Refueling Using Datalink Signals" by Gary A. McGraw, Robert J. Frank, Kenneth M. Peterson, Richard S. Haendel, and Scott J. F. Zogg. The present application is related to co-filed application Ser. No. 10/891,853 filed herewith entitled "A System and Method for Improving Aircraft Formation Flying Accuracy and integrity" by Kenneth W. Mc Elreath. The co-filed and co-pending applications are assigned to the assignee of the present invention.

BACKGROUND OF THE INVENTION

This invention relates to navigation and guidance of a follower aircraft such as an uninhabited air vehicle (UAV) relative to a leader aircraft and specifically to an aerial refueling and formation flying system for UAVs.

Aerial refueling and formation flying with an uninhabited air vehicle poses a unique flight control challenge because of the bandwidth of the control mechanism required and because it is desirable to implement a passive (non-RF emitting) positioning source.

With piloted aircraft aerial refueling, relative navigation for the rendezvous is accomplished with equipment such as TACAN and barometric altimeters. Fine navigation during connect, fueling, and disconnect is done visually by a pilot and a tanker boom operator. For the rendezvous phase, the major problem with TACAN is that it is not a low-observable waveform.

Uninhabited air vehicles require precise relative navigation capability to perform many mission functions such as formation flying and aerial refueling. In most situations GPS techniques suitably augmented with inertial data may suffice for UAV relative navigation. In a UAV aerial refueling system, coarse position reporting during rendezvous is sufficient. High accuracy is not required with standalone GPS positioning being adequate. For communications with the UAV a low-observable communications datalink is needed with a modest data rate. Precise, low-latency three-dimensional relative navigation is required throughout the entire capture/connect/fueling/disconnect process with the tanker boom operator having control over the UAV at close range.

High-accuracy relative positioning is required during capture and refueling or during formation flying of the UAV. A system is desired that offers the needed control bandwidth with a low observable datalink means.

SUMMARY OF THE INVENTION

An aircraft formation/refueling guidance system for guiding a follower aircraft relative to a leader aircraft is disclosed. A datalink onboard the leader aircraft and the follower aircraft provides a position hold command and a bias command from the leader aircraft to the follower aircraft. An optical tracker onboard the follower aircraft takes an image of the leader aircraft when receiving the position hold command from the leader aircraft, tracks the leader aircraft using the image of the leader aircraft, and provides optical tracker movement outputs. A resolver connected to the optical tracker resolves the optical tracker movement outputs when tracking the leader aircraft to provide resolver control signals to an autopilot. The optical tracker tracks the leader aircraft body outline during daylight and position lights during night. A vernier control receives the bias command from the leader aircraft over the datalink to change a position of the follower aircraft by biasing the resolver control signals with a bias signal. A sum circuit connected to the resolver and to the vernier control receives the resolver control signals and the bias signal for providing a sum circuit output signal. An autopilot and autothrottle connected to the sum circuit receives the sum circuit output signal and the position hold command to control the follower aircraft.

It is an object of the present invention to provide guidance for formation flying and refueling for uninhabited aircraft.

It is an object of the present invention to provide an optical tracker and a short-range, low-power discrete data link to provide required bandwidth and a passive non-RF emitting positioning source to guide a follower aircraft.

It is an advantage of the present invention to provide a vernier control to adjust position of a follower aircraft from a leader aircraft.

It is a feature of the present invention to provide a close range guidance system with excellent resolution and accuracy.

It is a feature of the present invention to provide a system that can be used to relieve pilot workload and improve precision for piloted aircraft as well an uninhabited air vehicles.

DESCRIPTION OF THE DRAWINGS

The invention may be more fully understood by reading the following description of the preferred embodiments of the invention in conjunction with the appended drawing wherein.

DETAILED DESCRIPTION

The present invention is for an aircraft formation/refueling guidance system that may be installed on a follower aircraft such as an uninhabited air vehicle (UAV). This system includes a forward-looking optical target tracker, a relative position error and roll attitude resolver, and a low-power datalink for initiating a relative position hold mode and for providing vernier bias commands from a leader aircraft to the follower aircraft, and a guidance interface to autopilot and autothrottle systems on board the follower aircraft.

Figure 1:
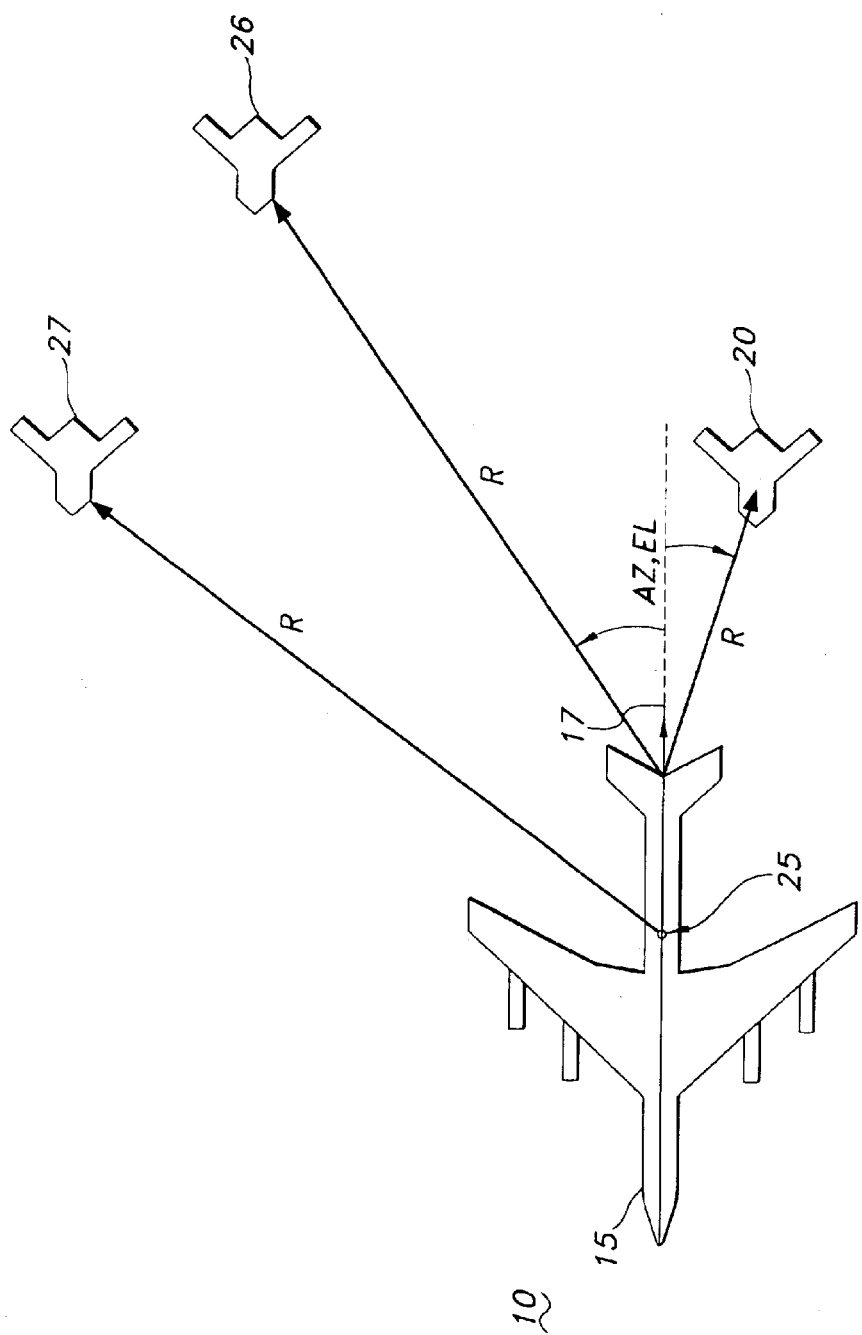
FIG. 1 is a diagram showing a refueling implementation of the aircraft formation/refueling guidance system of the present invention.

The aircraft formation/refueling guidance system of the present invention may be implemented in a refueling scenario as illustrated in FIG. 1. An antenna 25 on a leader aircraft 15 such as a tanker permits communications with one or more follower aircraft 20, 26, and 27 that may be UAVs over the datalink on the leader aircraft 15 and the follower aircraft 20, 26, and 27. A formation flying scenario is similar. While three follower aircraft are shown in FIG. 1, the number may be more or less since the system of the present invention is adaptable to any number of follower aircraft.

Figure 2:
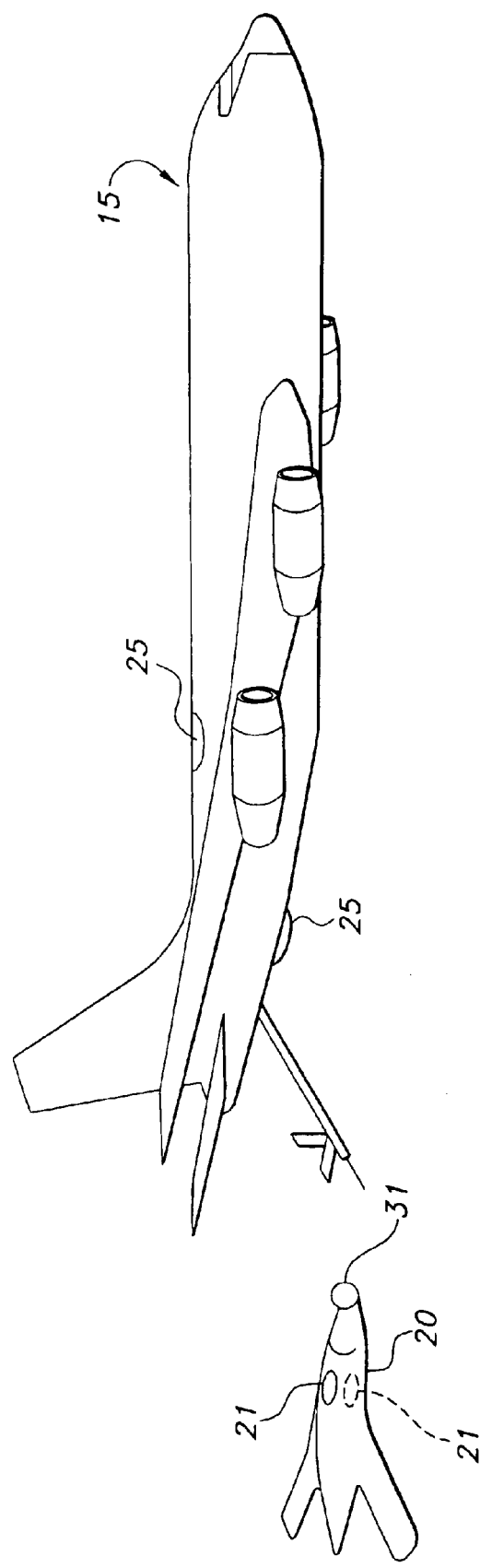
FIG. 2 is an additional view of the refueling scenario of FIG. 1.

FIG. 2 is an additional view of the refueling scenario. In FIG. 2, the UAV follower aircraft 20 may have antennas 21 located at top and bottom for datalink reception. The tanker 15 may have datalink antennas 25 located on top and bottom of the tanker fuselage. A forward-looking optical tracker 31 may be installed in the nose of the UAV follower aircraft 20.

Figure 3:
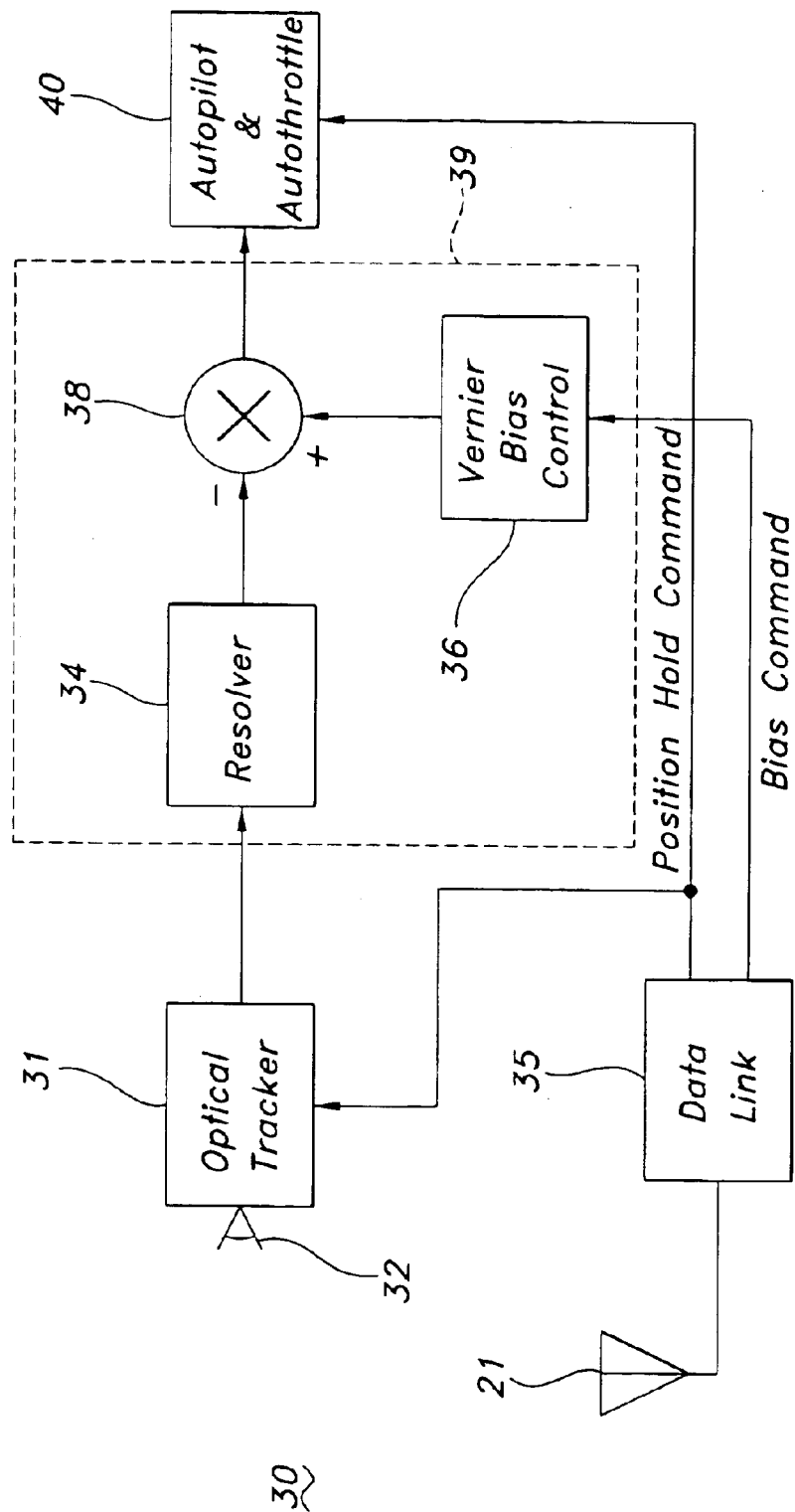
FIG. 3 is a block diagram of the aircraft formation/refueling guidance system of the present invention.

The aircraft formation/refueling guidance system 30 of the present invention is shown in FIG. 3. The system 30 is installed on follower aircraft 20, 26, and 27 shown in FIG. 1. Leader aircraft 15 contains a datalink transceiver (not shown) connected to antennas 25 to transmit and receive datalink signals to the follower aircraft 20, 26, and 27.

The system 30 comprises an optical tracker 31 known in the art. The optical tracker 31 includes a camera 32 that may be a charge coupled device (CCD) camera or other imaging means for obtaining an image of the leader aircraft 15. The optical tracker 31 locks on to the image of leader aircraft 15. As the leader aircraft 15 and/or the follower aircraft 20 with system 30 move relative to each other, the optical tracker 31 moves along with the follower aircraft 20 to maintain a lock on the image of the leader aircraft 15. The output of the optical tracker 31 is connected to a resolver 34 that may be a part of a digital processor 39. The resolver 34 resolves optical tracker 31 outputs into right/left, up/down, fore/aft (using image size) positions and relative roll attitude between leader aircraft 15 and follower aircraft 20. Since the aircraft 15 and the follower aircraft 20 are relatively close, within 100 meters, the resolution and accuracy of these measurements will be excellent.

The resolver control signals are passed to a sum circuit 38 that may be part of the digital processor 39 that contains the resolver 34. In the sum circuit 38 a bias signal from a vernier control function 36 may be applied when a vernier bias command is received over the data link from the leader aircraft 15. The vernier control function 36 that may be part of the digital processor 39 provides right/left, up/down, and forward/aft bias command signals, as directed from the leader aircraft 15. A sum circuit 38 output signal is then applied to an autopilot and autothrottle function 40 for maneuvering the follower aircraft 20 and adjusting its speed to match the bias commands. The autopilot and autothrottle 40 are known in the art and provide outputs to control the follower aircraft control surfaces and thrust.

The datalink 35 comprises a low-power RF, optical or infrared data link that transmits the position hold and vernier bias commands to the UAV 20, where the commands are received and passed to the optical tracker 31 and the vernier bias control 36. The data link is installed on the leader aircraft 15 and follower aircraft 20.

In operation conventional navigation and guidance techniques such as GPS and INS are used by the follower aircraft 20 to fly a track and/or heading to intercept the leader aircraft 15. Once the leader aircraft 15 and the follower aircraft 20 maneuver to an acceptable window of relative positions, a command received over data link 35 in the follower aircraft 20 is sent from the leader aircraft 15 to initiate a relative position hold mode in a follower autopilot 40 shown in FIG. 3.

Upon receiving the position hold command, the optical tracker 31 in the follower aircraft 20 takes a snapshot image of the leader aircraft 15 with the camera 32 in optical tracker 31 and begins to track that image using the aircraft's outline in daytime or position lights at night. As the optical tracker 31 and camera 32 move to maintain lock on that image, the optical tracker 31 outputs those movements to the resolver 34 that resolves the tracker 31 movements into right/left, up/down, fore/aft (using image size) positions and relative roll attitude resolver control signals.

If the leader aircraft 15 or its crew determines that the follower aircraft 20 should assume a different relative position in either lateral, vertical or fore/aft dimensions, a vernier bias command can be sent from the leader aircraft 15 to the follower aircraft 20 over the datalink 35. This bias command causes the bias signal to be introduced into the guidance system by the vernier bias control 36 that offsets the relative position hold mode from its initial position. This offset can be used to fly the follower aircraft 20 anywhere within the window of the optical tracker 30 lock.

A relative roll attitude output of the resolver 34 is used to enable the follower aircraft 20 to follow the leader aircraft 15 through maneuvers such as refueling orbits, without introducing lateral or vertical position errors during turn roll-in, roll-out transitions.

It is believed that the aircraft formation/refueling guidance system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An aircraft formation/refueling guidance system for guiding a follower aircraft relative to a leader aircraft comprising:
   a datalink onboard the leader aircraft and the follower aircraft for providing a position hold command and a bias command from the leader aircraft to the follower aircraft;
   an optical tracker onboard the follower aircraft to take an image of the leader aircraft when receiving the hold command from the leader aircraft, to track the leader aircraft using the image of the leader aircraft, and to provide optical tracker movement outputs;
   a resolver connected to the optical tracker to resolve the optical tracker movement outputs when tracking the leader aircraft to provide resolver control signals;
   a vernier control for receiving the bias command from the leader aircraft over the datalink to change a position of the follower aircraft by biasing the resolver control signals with a bias signal;
   a sum circuit connected to the resolver and to the vernier control for receiving the resolver control signals and the bias signal for providing a sum circuit output signal; and
   an autopilot and autothrottle connected to the sum circuit to receive the sum circuit output signal and connected to the datalink to receive the position hold command to control the follower aircraft.

2. The aircraft formation/refueling guidance system for guiding a follower aircraft relative to a leader aircraft of claim 1 wherein the optical tracker further comprises a charge coupled device camera for taking the image of the leader aircraft.

3. The aircraft formation/refueling guidance system for guiding a follower aircraft relative to a leader aircraft of claim 2 wherein the optical tracker tracks the leader aircraft body outline during daylight and position lights during night.

4. The aircraft formation/refueling guidance system for guiding a follower aircraft relative to a leader aircraft of claim 1 wherein the resolver provides right/left, up/down, fore/aft and roll attitude resolver control signals.

5. The aircraft formation/refueling guidance system for guiding a follower aircraft relative to a leader aircraft of claim 4 wherein the resolver further comprises a part of a digital processor.

6. The aircraft formation/refueling guidance system for guiding a follower aircraft relative to a leader aircraft of claim 4 wherein the vernier control comprises a part of the digital processor.

7. The aircraft formation/refueling guidance system for guiding a follower aircraft relative to a leader aircraft of claim 4 wherein the sum circuit comprises a part of the digital processor.

8. A method of guiding a follower aircraft relative to a leader aircraft in an aircraft formation/refueling guidance system comprising the steps of:

providing a position hold command and a bias command from the leader aircraft to the follower aircraft with a datalink onboard the leader aircraft and the follower aircraft;

taking an image of the leader aircraft with an optical tracker onboard the follower aircraft when receiving the hold command;

tracking the leader aircraft using the image of the leader aircraft;

providing optical tracker movement outputs;

resolving the optical tracker movement outputs when tracking the leader aircraft to provide resolver control signals with a resolver connected to the optical tracker;

changing a position of the follower aircraft by biasing the resolver control signals with a bias signal with a vernier control that receives the bias command from the leader aircraft over the datalink;

receiving the resolver control signals and the bias signal in a sum circuit connected to the resolver and to the vernier control;

providing a sum circuit output signal; and receiving the sum circuit output signal and the position hold command to control the follower aircraft in an autopilot and autothrottle connected to the sum circuit and the data link.

9. The method of guiding a follower aircraft relative to a leader aircraft in an aircraft formation/refueling guidance system of claim 8 wherein the optical tracker takes the image of the leader aircraft with a charge coupled device camera.

10. The method of guiding a follower aircraft relative to a leader aircraft in an aircraft formation/refueling guidance system of claim 9 wherein the optical tracker performs the steps of tracking the leader aircraft body outline during daylight and position lights during night.

11. The method of guiding a follower aircraft relative to a leader aircraft in an aircraft formation/refueling guidance system of claim 8 wherein the resolver performs the steps of providing right/left, up/down, and fore/aft positions and roll attitude resolver control signals.

12. The method of guiding a follower aircraft relative to a leader aircraft in an aircraft formation/refueling guidance system of claim 11 wherein the resolver performs the steps of resolving the optical tracker movement outputs and providing resolver control signals with a digital processor.

13. The method of guiding a follower aircraft relative to a leader aircraft in an aircraft formation/refueling guidance system of claim 8 wherein the vernier control performs the step of changing a position of the follower aircraft with a digital processor.

14. The method of guiding a follower aircraft relative to a leader aircraft in an aircraft formation/refueling guidance system of claim 8 wherein the sum circuit performs the steps of receiving the resolver control signals and the bias signal to provide the sum circuit output to the autopilot and autothrottle in a digital processor.

15. An aircraft formation/refueling guidance system for guiding a follower aircraft relative to a leader aircraft comprising:

a datalink onboard the leader aircraft and the follower aircraft for providing a position hold command and a bias command from the leader aircraft to the follower aircraft;

an optical tracker onboard the follower aircraft to take an image of the leader aircraft when receiving the hold command from the leader aircraft, to track the leader aircraft using the image of the leader aircraft, and to provide optical tracker movement outputs;

a digital processor connected to the optical tracker to resolve the optical tracker movement outputs when tracking the leader aircraft to provide resolver control signals; for receiving the bias command from the leader aircraft over the datalink to change a position of the follower aircraft by biasing the resolver control signals with a bias signal; and for summing the resolver control signals and the bias signal for providing a sum circuit output signal; and an autopilot and autothrottle connected to the digital processor to receive the sum circuit output signal and connected to the data link to receive the position hold command to control the follower aircraft.

16. The aircraft formation/refueling guidance system for guiding a follower aircraft relative to a leader aircraft of claim 15 wherein the optical tracker further comprises a charge coupled device camera for taking the image of the leader aircraft.

17. The aircraft formation/refueling guidance system for guiding a follower aircraft relative to a leader aircraft of claim 16 wherein the optical tracker tracks the leader aircraft body outline during daylight and position lights during night.

18. The aircraft formation/refueling guidance system for guiding a follower aircraft relative to a leader aircraft of claim 15 wherein the digital processor comprises a resolver that provides right/left, up/down, fore/aft and roll attitude resolver control signals.

19. The aircraft formation/refueling guidance system for guiding a follower aircraft relative to a leader aircraft of claim 15 wherein the digital processor further comprises a vernier control for receiving the bias command from the leader aircraft over the datalink to change the position of the follower aircraft by biasing the resolver control signals with a bias signal.

20. The aircraft formation/refueling guidance system for guiding a follower aircraft relative to a leader aircraft of claim 15 wherein the digital processor further comprises a sum circuit for summing the resolver control signals and the bias signal for providing a sum circuit output signal.

* * * * *